US007019841B2

(12) United States Patent
Mathur

(10) Patent No.: US 7,019,841 B2
(45) Date of Patent: Mar. 28, 2006

(54) SYSTEM AND METHOD FOR INSPECTING A COMPONENT USING INTERFEROMETRY

(75) Inventor: Sanjeev Mathur, Irving, TX (US)

(73) Assignee: August Technology Corp., Bloomington, MN (US)

(*) Notice: Subject to any disclaimer, the term of this patent is extended or adjusted under 35 U.S.C. 154(b) by 0 days.

(21) Appl. No.: 10/742,254

(22) Filed: Dec. 19, 2003

(65) Prior Publication Data

US 2004/0227953 A1 Nov. 18, 2004

Related U.S. Application Data

(60) Provisional application No. 60/434,926, filed on Dec. 19, 2002.

(51) Int. Cl.
*G01B 9/02* (2006.01)

(52) U.S. Cl. ....................... 356/497; 356/516; 356/511

(58) Field of Classification Search ................ 356/497, 356/503, 512, 516, 513, 479, 511, 489, 495
See application file for complete search history.

(56) References Cited

U.S. PATENT DOCUMENTS 4,105,335 A * 8/1978 Tanaka et al. .............. 356/497
4,575,246 A * 3/1986 Nishizawa et al. ......... 356/452
2004/0090634 A1* 5/2004 Mathur et al. .............. 356/497

* cited by examiner

*Primary Examiner*—Gregory J. Toatley, Jr.
*Assistant Examiner*—Patrick J. Connolly
(74) *Attorney, Agent, or Firm*—Dicke, Billig & Czaja, PLLC

(57) ABSTRACT

A system for inspecting a component is provided. The system includes an interferometer having a coated mirror, such as a coating that allows only a fraction of light to pass, where the coating has a predetermined thickness. An interference inspection system receives reflected light from the component through the interferometer and determines whether interference is occurring at each of two or more predetermined areas, such as at point corresponding to a bump contact and at a second point corresponding to a substrate. The thickness of the coating is related to a height difference between two or more of the predetermined areas, such as by creating interference at both areas by changing the reflection path length by an amount required to cause simultaneous interference fringing for a designed height difference.

10 Claims, 5 Drawing Sheets

SYSTEM AND METHOD FOR INSPECTING A COMPONENT USING INTERFEROMETRY

This application claims the benefit of Provisional Application No. 60/434,926, filed Dec. 19, 2002.

FIELD OF THE INVENTION

The present invention pertains to the field of component inspection systems. More specifically, the invention relates to a system and method for component inspection that uses interferometry, such as white light interferometry, to measure three-dimensional features of the component.

BACKGROUND OF THE INVENTION

Inspection systems that use image data are known in the art. Such inspection systems typically use image data from a component that has been illuminated by either a coherent or noncoherent source, and then perform image analysis processes on the image data to determine whether the component conforms to predetermined criteria. For example, image data analysis is used to determine whether components have been properly marked, have certain features, or meet other specified criteria. In this regard, a "feature" can include a desired feature, such as a contact, or an undesired feature, such as damage on the contact that extends from or into the surface of the contact.

One problem with such component inspection systems is that three-dimensional aspects of the component must be inferred from the image data. Thus, in many cases it is difficult to determine whether an indication in the image data is from a feature that extends above or below a plane of reference. Likewise, since such image data analysis uses relative changes in brightness to infer the location of features and to determine whether such features fall within predetermined allowable criteria, it often occurs that the features are not distinguishable under a single lighting source. While it is known to use multiple lighting sources, such as lighting sources from two different angles, such lighting sources may still result in image data that does not clearly identify features of the component that do not meet specified criteria, such as to allow the size of features to be accurately determined.

SUMMARY OF THE INVENTION

In accordance with the present invention, a system and method for component inspection are presented that overcome known problems with component inspection.

In particular, a system and method for component inspection are provided that allow surface coordinates of the component to be determined using interferometery.

In accordance with an exemplary embodiment of the present invention, a system for inspecting a component is provided. The system includes an interferometer, or interferometry apparatus, having a coated mirror, such as a coating that allows only a fraction of light to pass, where the coating has a predetermined thickness. An interference inspection system receives reflected light from the component through the interferometer and determines whether interference is occurring at each of two or more predetermined areas, such as at a point corresponding to a bump contact and at a second point corresponding to a substrate. The thickness of the coating is related to a height difference between two or more of the predetermined areas, such as by creating interference at both areas by changing the reflection path length by an amount required to cause simultaneous interference fringing for a designed height difference.

The present invention provides many important technical advantages. One important technical advantage of the present invention is a system and method for inspecting components that uses interferometry to determine three-dimensional surface coordinates of the component. The present invention allows monochromatic or white light interferometry to be used to generate interference fringes on the component, where the third axis coordinates can be determined from interference fringing.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
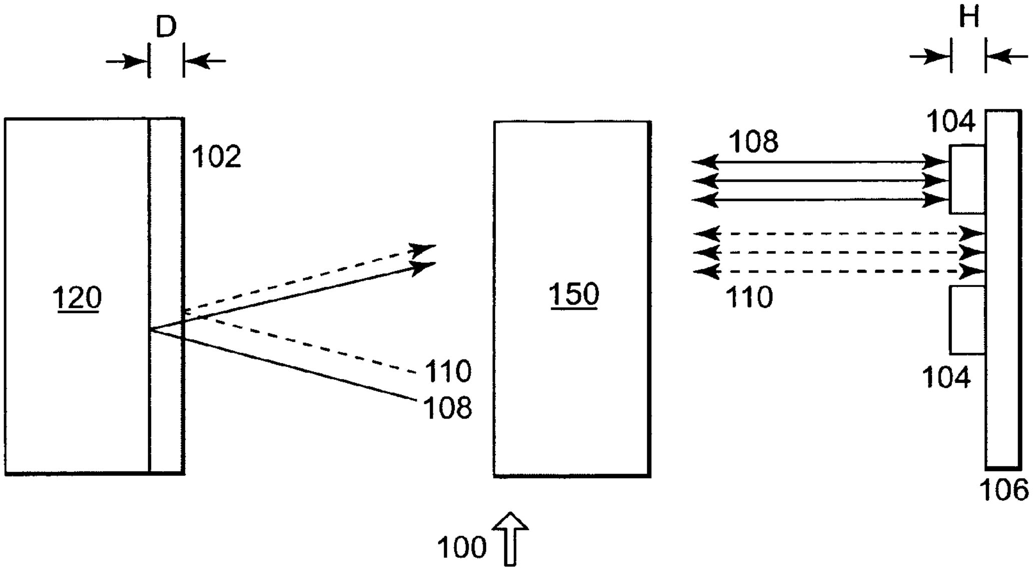
FIG. 1 is a diagram of a system for inspecting components using interferometry in accordance with an exemplary embodiment of the present invention.

In the description that follows, like parts are marked throughout the specification and drawings with the same reference numerals, respectively. The drawing figures are not necessarily to scale, and certain components can be shown in generalized or schematic form and identified by commercial designations in the interest of clarity and conciseness.

FIG. 1 is a diagram of a system 100 for inspecting components using interferometry in accordance with an exemplary embodiment of the present invention. System 100 includes mirror 120 with reflective coating 102. A component 106 having features 104, such as contact bumps, is inspected using mirror 120 in conjunction with an interferometry apparatus including interferometry component(s) 150, such as a light source and beam splitter. Light radiation 108 and 110 reflects off mirror 120 and reflective coating 102, respectively. In one exemplary embodiment, the frequency of light radiation 108 can be different from the frequency of light radiation 100. In another exemplary embodiment, reflective coating 102 can be semi-transparent and white light can be used, such that a portion of white light reflects off reflective coating 102 as light radiation 110 and another portion of white light reflects off mirror 120 as light radiation 108.

After light radiation 108 and 110 is reflected off of mirror 120 and reflective coating 102, it is used to illuminate component 106 having features 104. In one exemplary embodiment, reflective coating 102 can include a suitable semi-reflective metallic coating commonly used in the beam-splitter of an interferometer over a clear materials such as glass, wherein the entire thickness of the semi-reflective metallic coating and the underlying glass layer is equal to the thickness D. Likewise, other suitable materials can be used. The thickness D of reflective coating 102 corresponds to the height H of features 104 in a predetermined manner, such that light radiation 108 and 110 can create interference at the same time for elements of component 106 having a height difference H that corresponds to coating thickness D. When an uncoated mirror is used to generate interference such that only a single source of light radiation reaches component 106, interference is only generated for elements of component 106 having the same height. Thus, using a dual light source to create an interference pattern from component 106 allows interference to occur at a single mirror position for elements having two different heights. In this manner the height of features 104 can be verified by moving the position of mirror 120 relative to component 106 within a narrow range that will cause interference to occur at both the location of features 104 and the surface of component 106 or other suitable reference points, instead of having to move mirror 120 through a distance equivalent to the distance between the feature being measured and the reference point. Thus, if interference is only occurring at one of these two locations, and is not simultaneously occurring at each of these two locations, it can be readily determined that the height of feature 104 is not correct.

In operation, system 100 allows the height of features 104 of a component 106 to be verified. System 100 allows interference principles to be used to detect when interference is occurring at both the surface of component 106 and at the top of features 104, through the use of a semi-reflective coating over an interferometry mirror. The thickness of the coating causes interference to occur at a first area corresponding to a first height on the component, and at a second area corresponding to a second height on the component, such as by decreasing the path length of the light reflected by the coating by a length corresponding to the height difference. In this manner, the height of features of component 106 can be inspected using an interferometry apparatus, and image data can be generated to determine whether interference is occurring uniformly across elements of component 106, such as a semiconductor substrate and the tops of contact bumps. In this manner, if interference is not occurring at these two different locations, then it can be determined that the height of features 104 is not within a predetermined acceptable range.

Figure 2:
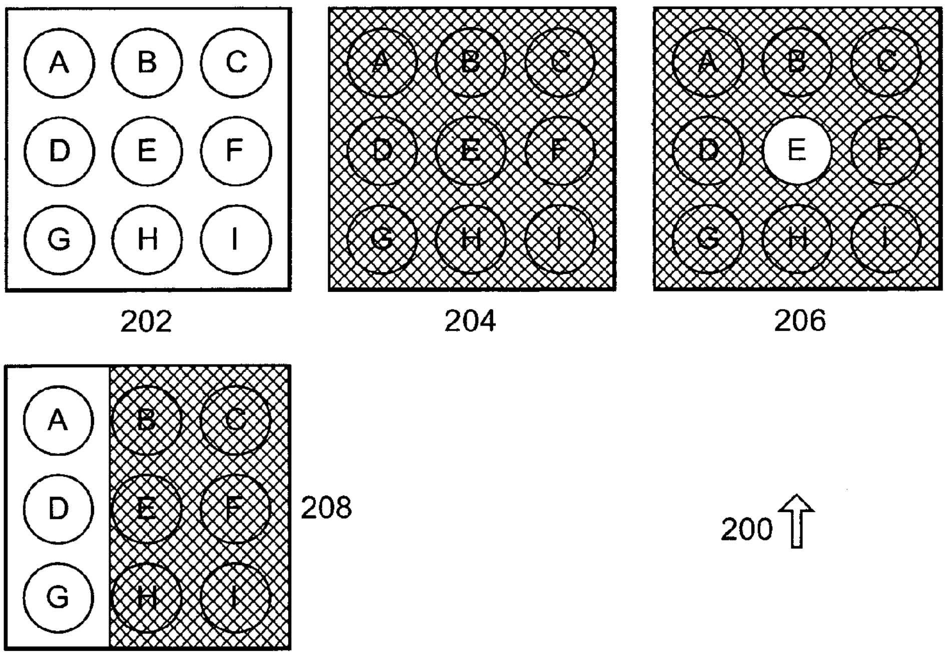
FIG. 2 is a diagram of interference maps in accordance with an exemplary embodiment of the present invention.

FIG. 2 is a diagram of interference maps 202 through 208 in accordance with an exemplary embodiment of the present invention. Interference map 202 includes nine exemplary features A through I, such as contact bumps on a substrate, which can comprise the remaining area of map 202. If each of the contact bumps A through I has a uniform height equal to a design height, then an interference map as shown in 204 can be created when a coated mirror such as mirror 120 with coating 102 from FIG. 1 is used to generate an interference pattern on the component in an interferometer. Thus, the height of features of component 202 can be readily determined by moving mirror 120 within a narrow range, such as until interference occurs throughout the entire mapped area.

Likewise, interference map 206 demonstrates the appearance of the component when a single contact point E has a height that is higher or lower than an allowable region about the design height. In this exemplary embodiment, interference map 206 shows interference occurring at all locations except for the point corresponding to contact E. Thus, it can be readily determined that contact E does not have specified parameters, and notification data can be generated indicating that the component should be further scrutinized or removed from production.

Interference map 208 shows another exemplary embodiment of an inspection process for a component, such as one with contact bumps A through I. As shown in interference map 208, interference is occurring over a portion of the substrate and for a portion of the contacts, whereas no interference is occurring for the left-most contacts A, D, and G, as well as for the substrate adjacent to these left-most contacts. Interference map 208 can indicate that the substrate of component 106 lies on an angle, such that the left-most side of the substrate is either higher or lower than the right hand side of interference map 208. In this exemplary embodiment, interference can be generated on the left hand side while the right hand side of the component goes out of interference by raising or lowering the component. Thus, interference map 208 is indicative of an angled substrate, a substrate lying on a base that is inclined at an angle sufficient to cause non-uniform interference, or of other conditions that make measurement of the height of contact bumps A through I difficult to implement using interferometry.

In operation, interference maps 202 through 208 can be used to inspect a component in an interferometry apparatus, in conjunction with a coated mirror 120 or using other processes to cause interference fringing on points having different heights. Interference maps 202 through 208 show exemplary conditions in which component inspection indicates an acceptable component, an unacceptable component, and potential problems with the inspection process that require operator attention. Suitable notification data can be generated based on interference maps 202 through 208 to allow the inspection process to be automated, to require operator notification to address unexpected conditions, or for other suitable purposes. Likewise, features other than contact bumps can be inspected.

Figure 3:
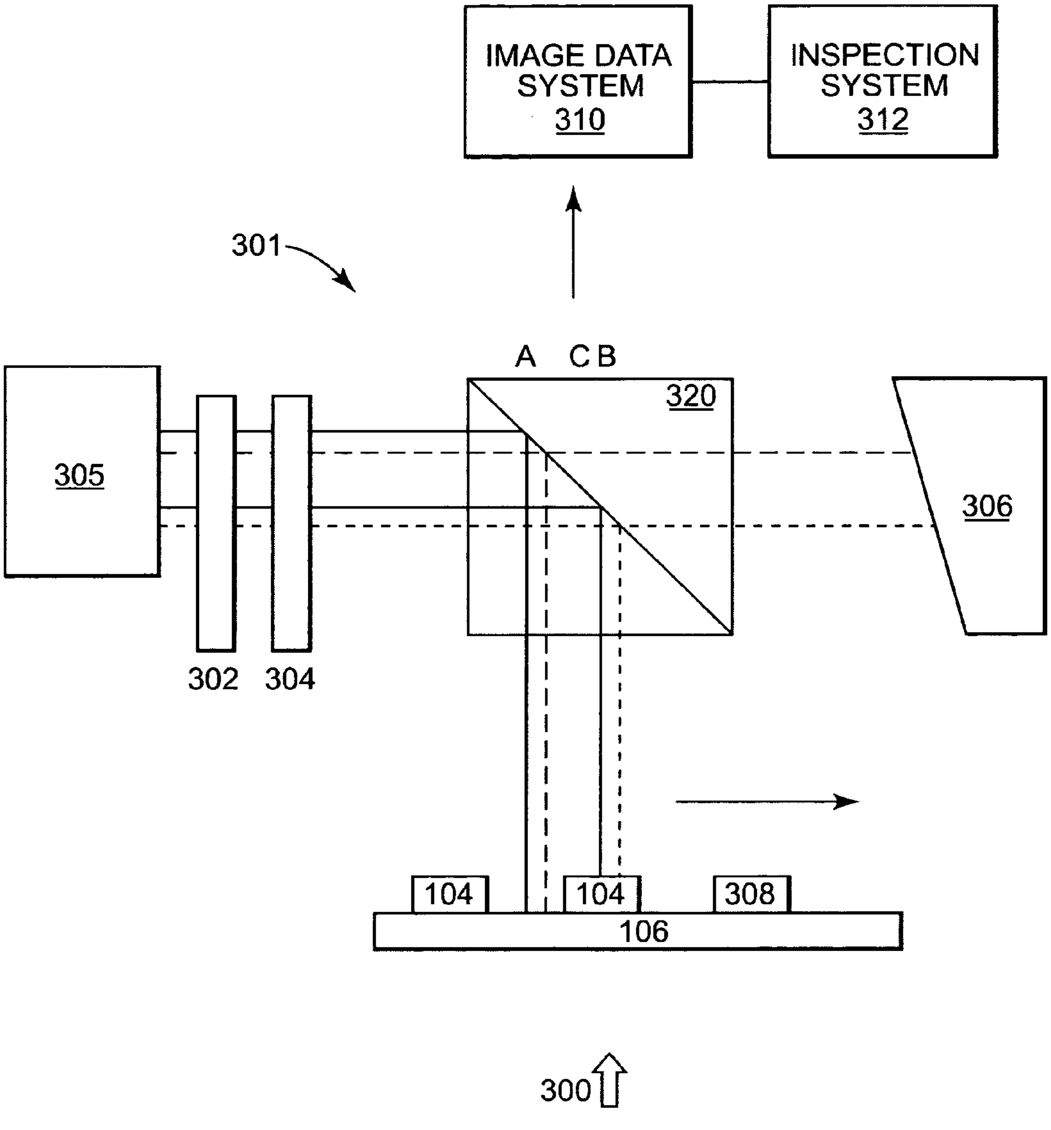
FIG. 3 is a diagram of a system for performing interferometry inspection in accordance with an exemplary embodiment of the present invention.

FIG. 3 is a diagram of a system 300 for performing interferometry inspection utilizing an interferometry apparatus or interferometer 301, including a light source 305 and a beam splitter 320 in accordance with an exemplary embodiment of the present invention. The interferometry apparatus 301 includes two features that can be used separately, in combination with each other, or in combination with other principles. The first feature is demonstrated by light filters 302 and 304. Light filter 302 can be used to filter light that is reflected from a surface of component 106, such as a semiconductor substrate, where such light has a frequency range that is different from light reflected from the top of features 104. In this manner, interferometry can be performed where light reflected from surfaces different than the surface of interest is reduced.

In one exemplary embodiment, the frequency bandwidth of light reflected from the surface of component 106 (i.e. the component substrate) is sufficiently different from the frequency bandwidth of light reflected from the top of features 104 so as to allow the light reflected from the substrate to be filtered to reduce substrate interferometry effects and to improve the ability to detect feature 104 interferometry effects. Likewise, filter 304 can be used to filter out a frequency bandwidth of light reflected from adjacent features 308, such as where such adjacent features 308 have a frequency bandwidth response that is different from the light reflected from the surface of component 106 or the surface of features 104. Likewise, additional filters can be used where suitable to further remove light from features or surfaces that are not required for inspection of features 104. Different light sources can likewise be used in place of a white light source and filters, such as non-monochromatic sources having bandwidths that correspond to the frequency band of the feature of interest.

Component 106 can also be inspected using an angled mirror 306 in conjunction with the interferometry apparatus 301. System 300 includes the interferometry apparatus 301, which utilizes angled mirror 306 with component 106 being moved in the direction shown by the arrow in FIG. 3. As the component is moved, interference will occur at predetermined locations based on whether the height of the component 106, feature 104 or feature 308 causes interference at those predetermined locations. For example, if the difference in height across mirror 306 caused by the angular displacement is greater than one wavelength for monochrome light, then interference can occur at two or more locations for a component 106 having features of various heights. For example, for features 104 and 308, interference can occur at two locations when using angled mirror 306, if the displacement in the direction that the light travels is greater than one wavelength for monochrome light, then interference can occur at two or more locations for a component 106 having features of various heights. For example, for features 104 and 308, interference can occur at two locations when using angled mirror 306, if the displacement in the direction that the light travels is greater than one wavelength for monochrome light, such as from 400 to 750 nanometers or other suitable distance.

In another exemplary embodiment, the angular displacement of angled mirror 306 can be such that interference will occur at only one location within the inspection zone. For example, at point A, interference can occur for an object having a height corresponding to surface of component 106. Likewise, for an object having the height of feature 308, interference can occur at point C, and for objects having the height of feature 104, interference can occur at point B. Thus, in this exemplary embodiment, if the profile of component 106 with features 104 and 308 is known, then points A, B, and C can be monitored to determine whether interference is occurring as a function of time as the component is moved, so as to generate a profile of predetermined heights of component 106 as it is moved. This profile data can then be compared to template profile data to determine whether the correct height has been measured for such features. Likewise, additional monitoring points can be measured to determine whether interference is occurring at locations where it should not be occurring at, such as by analyzing each point in an N×M pixel array of the inspection area.

Light from the interferometry apparatus 301 is received at image data system 310, which can be a CMOS imager or other suitable image data generation devices. Image data system 310 is coupled to inspection system 312, which can be implemented in hardware, software, or a suitable combination of hardware and software, and which can be one or more software systems operating on a general purpose processing platform. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system.

In operation, system 300 allows two different inspection techniques to be used to inspect a component 106 with features 104 and 308. The first inspection technique utilizes filters to reduce interference effects for features that are not of interest, such as substrates, features having a height different from the height of features being inspected, and other features. In this manner, where the bandwidth of light reflected by a feature of interest is sufficiently different from the bandwidth of light reflected from other features or substrates, interference effects from those other features or substrates can be reduced to improve the ability to detect interference occurring for the features of interest.

Likewise, an angled mirror 306 can be used that causes interference to occur at predetermined points for features having known or expected heights. These predetermined points can then be measured and profile data can be generated to determine whether the measured profile data matches expected profile data. Other suitable processes can be utilized using an angled mirror 306, such as processes that use mapping of height data from the inspection area, processes that use stationary component measurements, or other suitable processes.

Figure 4:
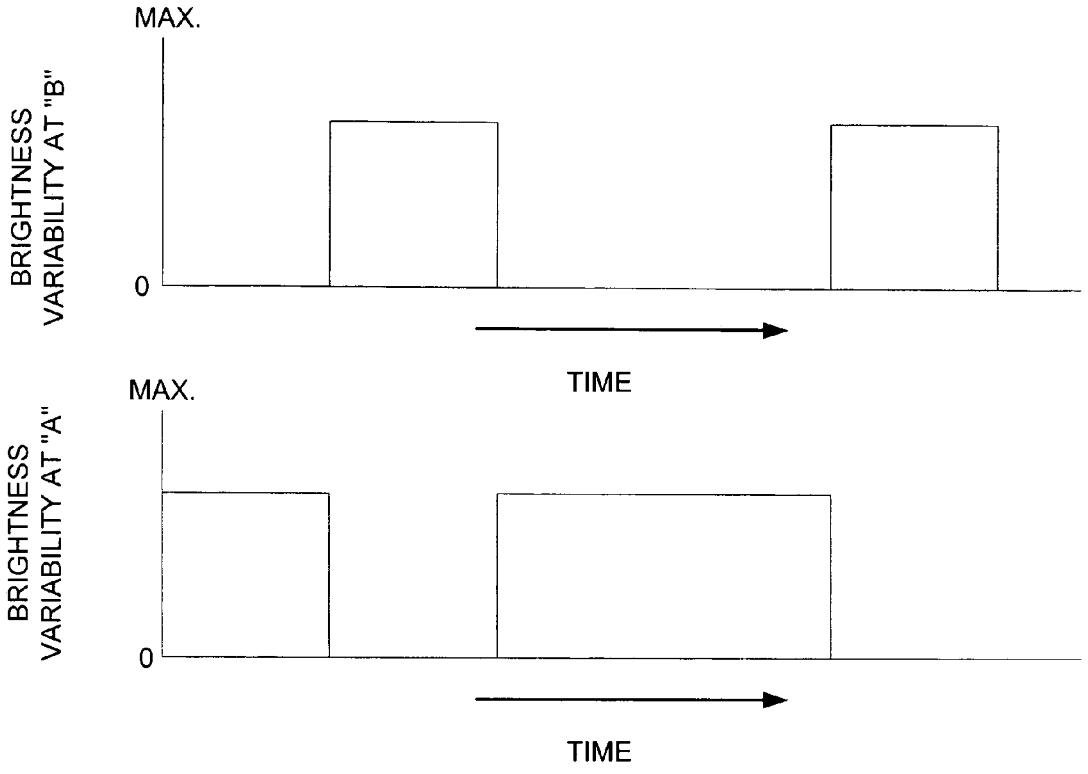
FIG. 4 is a diagram of a profile in accordance with an exemplary embodiment of the present invention.

FIG. 4 is a diagram of a profile 400 in accordance with an exemplary embodiment of the present invention. Profile 400 shows brightness variability at point A and point B for a component 106 having features 104, where the component is being moved in a direction shown in FIG. 3. The brightness variability occurring at point A corresponds to interference occurring for the substrate or the surface of component 106. Likewise, the brightness variability of point B corresponds to interference occurring at the surface of feature 104 of component 106. As component 106 is moved in the direction of the arrow in FIG. 3, a time variation occurs at points A and B that forms profile 400. In this manner, the height of features 104 can be verified individually, such as by using the brightness variability at point B to generate a profile, or in conjunction with other features, such as by using the brightness variability at point A to generate a profile. When interference is occurring at these points, a variability in the brightness measured at such points can occur, which is caused due to interference fringing. Likewise, when no interference is occurring, the brightness measured at such points will remain relatively constant with little variability. This technique can be used to quickly measure the height of components. Likewise, multiple points can be measured to determine the height of other component features, to compensate for non-plainer surface affects of component 106, or in other suitable manners.

Figure 5:
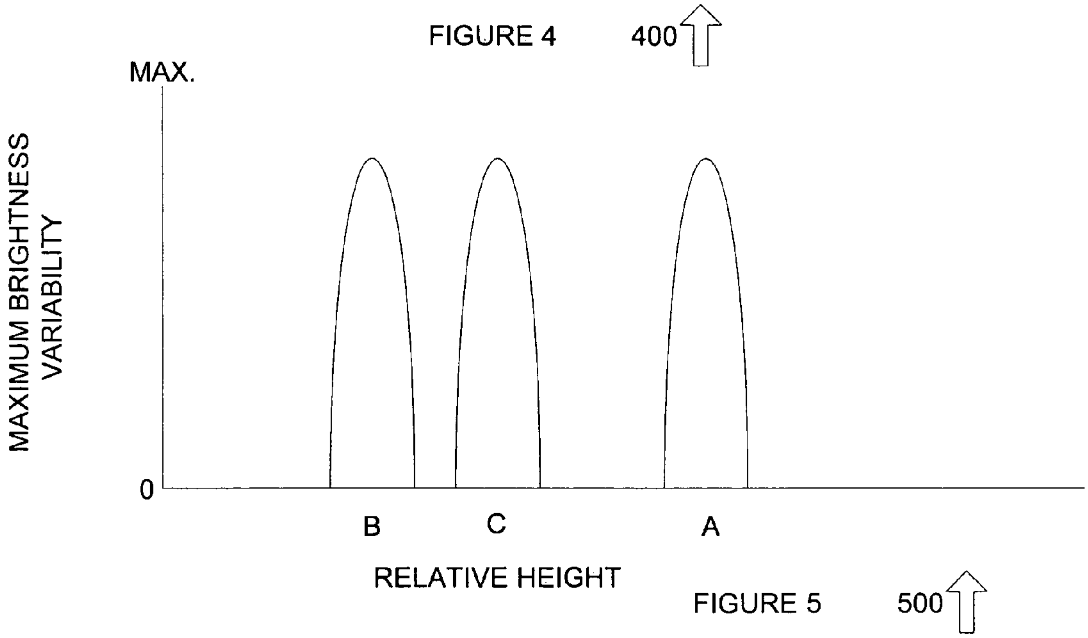
FIG. 5 is a graph of brightness variability at a point created using an angled mirror in an interferometry inspection apparatus with a moving component in accordance with an exemplary embodiment of the invention.

FIG. 5 is a graph 500 of brightness variability at a point created using an angled mirror in an interferometry inspection apparatus, such as the interferometry apparatus 301 (FIG. 3), with a moving component in accordance with an exemplary embodiment of the invention. Graph 500 shows variability in brightness as a function of the relative height of features measured using an interferometry apparatus, such as interferometry apparatus 301, with the angled mirror

306, or other suitable inspection processes. As shown in FIG. 5, for a height at point B corresponding to the height of feature 104, the brightness variability will increase and peak at a point corresponding to the height of feature 104. Likewise, for a feature having a lower height such as feature 308, the brightness variability will reach a peak at point C, which lies between points A and B. At point A, which corresponds to the height of the surface of component 106, or the substrate, the brightness variability will peak at point A. Component 106 can be inspected using the angled mirror 306 and this principle to detect the height of the features of a component, or to verify that the height of the features corresponds to a desired height. Thus, an inspection process using this principle can be implemented to quickly inspect components and to measure the height of features on the components.

Figure 6:
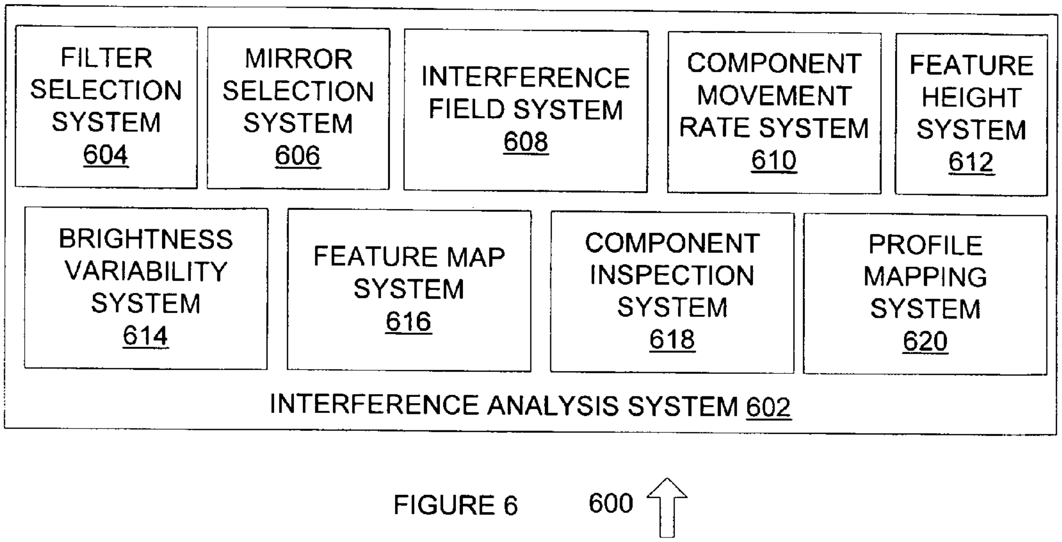
FIG. 6 is a diagram of a system for performing an inspection using interference data in accordance with an exemplary embodiment of the present invention.

FIG. 6 is a diagram of an inspection system 600 for performing an inspection using interference data in accordance with an exemplary embodiment of the present invention. Inspection system 600 includes interference inspection system 602 and filter selection system 604, mirror selection system 606, interference field system 608, component movement rate system 610, feature height system 612, brightness variability system 614, feature map system 616, component inspection system 618, and profile mapping system 620, each of which can be implemented in hardware, software, or a suitable combination of hardware and software, and which can be one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Filter selection system 604 receives bandwidth data and selects one or more filters based on the bandwidth data for use in conjunction with an inspection. In one exemplary embodiment, filter selection system 604 receives bandwidth data from a filter, such as one that associates the filter with a type of component, a type of material, or other suitable selection criteria. In this exemplary embodiment, filter selection system 604 can receive the filter identification data from a filter when it is inserted into position, can provide filter selection data to an operator to notify the operator of which filter to place in a position, can receive model number data for a device being inspected and can select a filter for use with the inspection, or can perform other suitable filter selection functions.

Mirror selection system 606 receives component data or other suitable inspection data and selects a mirror angle or a coated mirror based on the component being inspected. In one exemplary embodiment, mirror selection system 606 can generate data for use by an operator, can receive mirror data for use in determining inspection parameters, or can perform other suitable functions. For example, mirror selection system 606 can receive a component identifier and can select a coated mirror or angled mirror for inspection of the component based on predetermined component features. Likewise, mirror selection system 606 can receive data from a mirror after it is placed and positioned by an operator, such as coating thickness data or mirror angle data, and can use such data to determine inspection points, inspection criteria, or to perform other suitable mirror selection functions.

Interference field system 608 receives image data of a component from an interferometer, such as the interference apparatus 301, and generates interference field data. In one exemplary embodiment, interference field system 608 can measure brightness variability that is used to establish interference conditions, and can further analyze the brightness variability data to determine the mid-point of an interference pattern, the peak brightness variability, or other suitable artifacts of interference. Interference field system 608 can analyze an entire field (such as by analyzing each pixel of an N×M pixel array), predetermined sections of a field, or other suitable data to determine whether interference is occurring within predetermined areas.

Component movement rate system 610 generates component movement rate data for use in performing inspections. In one exemplary embodiment, component movement rate system 610 can generate data that is used to correlate profile data with the component movement rate so as to determine whether the component profile data matches predetermined acceptable profile data. In another exemplary embodiment, component movement rate system 610 controls the movement rate of a component to match a predetermined movement rate. Other suitable movement rate functions can be performed.

Feature height system 612 receives image data and interference data and generates feature height data. In one exemplary embodiment, feature height system 612 can receive interference data and can generate feature height data, such as by determining the point at which interference has reached a maximum or other suitable data. Likewise, feature height system 612 can receive brightness variability data from a plurality of points and can select the point at which the brightness variability data has reached a maximum or other suitable feature height data.

Brightness variability system 614 receives pixel brightness data and measures brightness variability of the pixel brightness data. In one exemplary embodiment, a normal range for pixel brightness variability can be determined such that pixel brightness variations within such normal ranges are not tracked. In another exemplary embodiment, brightness variability system 614 can store pixel brightness measurements over time, can store an indicator of pixel brightness variation and whether such a variation is increasing or decreasing, or other suitable data can be generated and used to determine whether interference is occurring at a point, over a field, or in other suitable configurations.

Feature map system 616 receives feature map data that can be used to determine whether interference patterns received for the feature are indicative of unacceptable conditions for the component. In one exemplary embodiment, feature map system 616 can analyze one or more contacts and one or more surface areas to determine whether the relative height of the contact meets specified tolerances. In another exemplary embodiment, feature map system 616 can identify areas in which interference data should be measured or pixel brightness variability data should be measured as a component is examined in a stationary position, as it is moved, or in other suitable locations.

Component inspection system 618 receives feature height data, interference data, or other suitable data such as brightness data and generates pass/fail data for a component. In one exemplary embodiment, component inspection system 618 can receive brightness variability data for a plurality of locations across a component, and can determine whether any of those locations have unacceptable data, whether an unacceptable number of locations have unacceptable data, or other suitable conditions. Component inspection system 618 can then generate a pass indicator, such as control data that allows the inspection process to continue for the next component, a fail indicator, such as control data that allows a failed component to be removed or marked, or other suitable data, such as data that notifies an operator to determine the state of the component based on borderline or anomalous data.

Profile mapping system 620 receives brightness variability data and generates profile data based on the brightness variability data. In one exemplary embodiment, profile mapping system 620 interfaces with component movement rate system 610 to generate a profile of the component as it is moved, such as that shown in FIG. 4.

In operation, inspection system 600 allows a component to be inspected using interference principles. For example, component height data can be determined using a coated mirror, an angled mirror, two or more filters or light sources, or other suitable data. System 600 thus allows component height measurements to be performed using interference principles in a manner that allows accelerated component examination.

Figure 7:
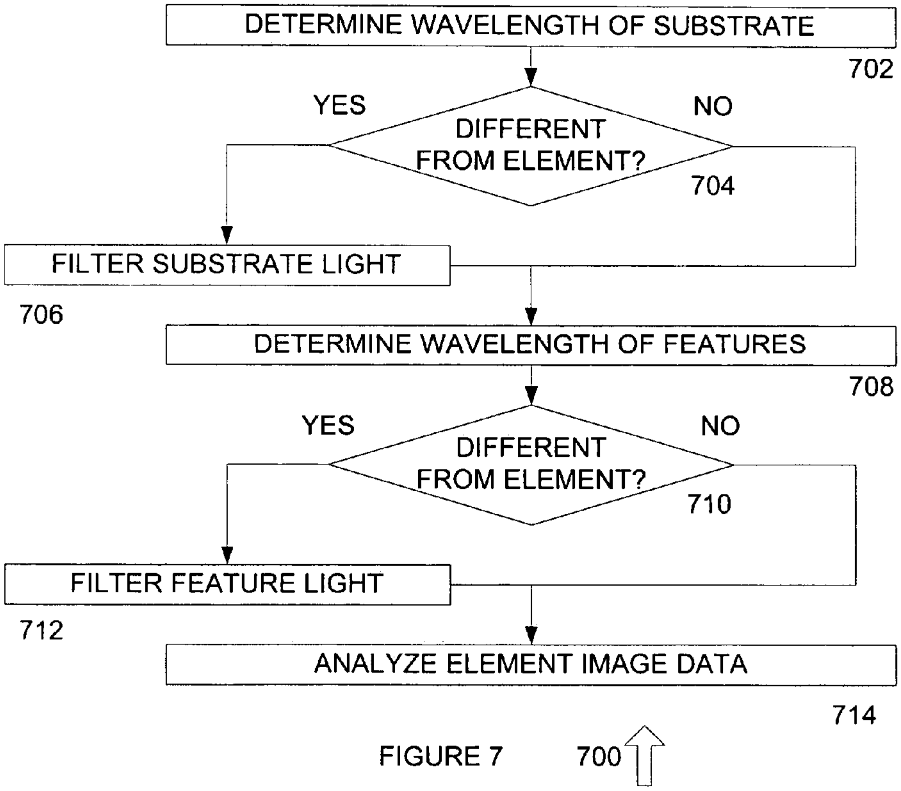
FIG. 7 is a flow chart of a method for selecting one or more filters in accordance with an exemplary embodiment of the present invention.

FIG. 7 is a flow chart of a method 700 for selecting one or more filters in accordance with an exemplary embodiment of the present invention. Method 700 begins at 702 where a frequency band of reflected light from a component substrate is determined. In one exemplary embodiment, a component substrate can reflect light in a frequency band that is different from the frequency band in which light is reflected for other features of interest of the component. The method then proceeds to 704.

At 704 it is determined whether the frequency band of light reflected from the component substrate is different from the frequency band of light reflected from an element of interest of the component. For example, the element of interest can be a contact bump or other feature that is being inspected. If there is no difference the method proceeds to 708. Otherwise the method proceeds to 706 where the substrate light component is filtered. In one exemplary embodiment, selection of the filter can occur automatically such that the filter is retrieved and inserted into a filter support using automated processes. In another exemplary embodiment, selection of the filter can occur based on stored data associated with a model type, such as where method 700 is used to configure inspection equipment. Other suitable processes can be used. The method then proceeds to 708.

At 708 the frequency band for light reflected from one or more features is determined. The method then proceeds to 710 where it is determined whether the frequency band for such features is different from the frequency band of light reflected from the element of interest. If there is no difference the method proceeds to 714 where the element image data is analyzed. Otherwise the method proceeds to 712 where the feature frequency band is filtered. In one exemplary embodiment, the filter can be selected automatically based on a model number, can be selected based on operator input, such as at a programming stage, or in other suitable manners. The method then proceeds to 714 where the image data is analyzed to determine whether the elements have a correct height or other suitable parameters.

In operation, method 700 allows a filter or filters to be selected to improve the ability to detect interference occurring at a feature of interest on the component. Method 700 allows light reflected from the substrate to be filtered to improve the ability to detect contacts or other features, allows light from other features on a wafer to be filtered so as to avoid having light from those features complicate the analysis of the image data, or other suitable processes can be implemented.

Figure 8:
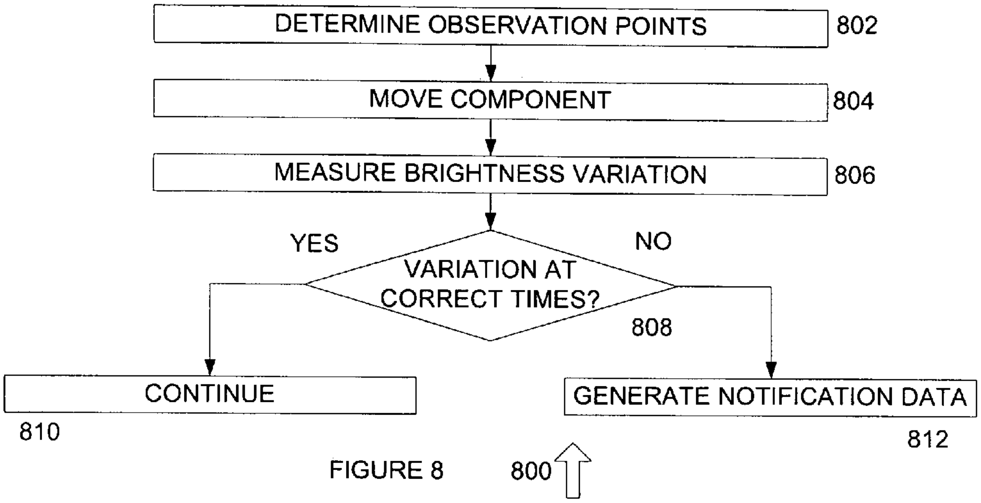
FIG. 8 is a flow chart of a method for inspecting components using interferometry principles in accordance with an exemplary embodiment of the invention.

FIG. 8 is a flow chart of a method 800 for inspecting components using interferometry principles in accordance with an exemplary embodiment of the invention. Method 800 begins at 802 where one or more observation points are determined. In one exemplary embodiment, the observation points can be based on an angled mirror and a component that is being moved through the inspection points, such as to generate profile data. In another exemplary embodiment, the observation points can be based on a stationary inspection using a coated mirror, such as where a component map is used to select features having predetermined heights. Other suitable observation points can also or alternatively be determined. The method then proceeds to 804.

At 804 the component is moved. In one exemplary embodiment, the component can be moved at a constant rate, such as where profile data is being measured. In another exemplary embodiment, the component can be moved into an inspection position and held stationary. Likewise other suitable processes can be used. The method then proceeds to 806.

At 806 brightness variations are measured. In one exemplary embodiment, the brightness variations can be measured at predetermined points as a component is moved. In another exemplary embodiment, the brightness variations can be measured at each pixel in an N×M pixel array, such as to generate a map of interference locations. The method then proceeds to 808.

At 808 it is determined whether brightness variation is occurring. For example, if an angled mirror is being used in an interferometer apparatus to inspect a component, then the profile generated as the component moves at a predetermined point should correspond with the profile at other predetermined points corresponding to similar features. Likewise, if the component being inspected is held stationary such that a field of interference is being observed, it can be determined whether all points are going to interference at same time, whether some points go into interference before or after a specified range of times, or whether other suitable interference is occurring. If it is determined that variation is occurring at the correct times the method proceeds to 810 and inspection of the component continues. Otherwise the method proceeds to 812 where notification data is generated, such as component pass/fail data, operator notification data requesting additional operator review of the component, process control data or other suitable data.

In operation, method 800 is used to perform an inspection of components using interferometry. Method 800 can be used to measure fields of interference data, such as where a coated mirror is being used, can be used to measure profile data such as where an angled mirror is being used, can be used with light sources or filters that are used in conjunction with a coated mirror, angled mirror, or flat mirror, or other suitable processes can be used.

Figure 9:
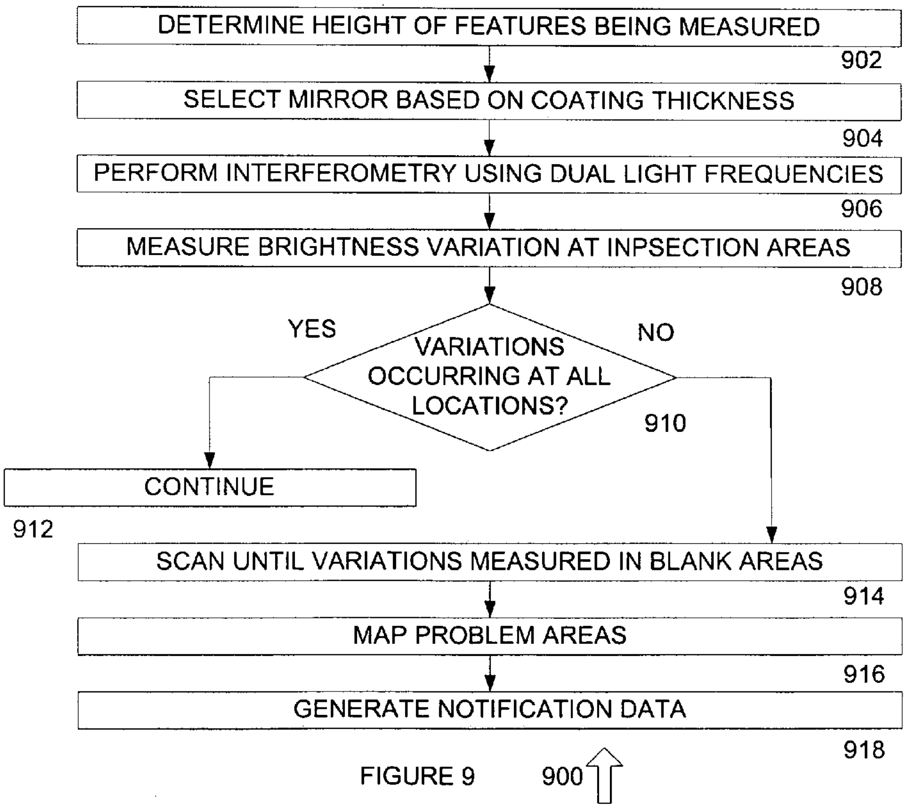
FIG. 9 is a flow chart of a method for inspecting components using interferometery in accordance with an exemplary embodiment of the present invention.

FIG. 9 is a flow chart of a method 900 for inspecting components using interferometery in accordance with an exemplary embodiment of the present invention. Method 900 begins at 902 where the height of features that are being measured is determined. In one exemplary embodiment, the height can be based on design data. The method then proceeds to 904.

At 904 a mirror is selected based on a coating thickness. For example, the mirror can be selected having a semi-reflective or reflective coating that reflects a portion of the bandwidth of the light, that reflects light of a predetermined wavelength, or other suitable coatings, where the thickness of the coating creates an interference affect for two or more heights of a component. In this exemplary embodiment, the coated mirror allows the height of a feature to be readily determined by determining whether predetermined locations of the component map area goes into interference at the same time. If a coated mirror is not used the method proceeds directly to 906.

At 906 interferometry can be performed using dual light frequencies. In one exemplary embodiment, one or more filters or can be used, where each filter removes a predetermined bandwidth. In another exemplary embodiment, two light sources can be used that generate light having different monochromatic frequencies or different frequency bands. Likewise, the dual light frequencies can include white light interferometry where the coating is a semi-reflective coating that causes the white light to have a first path length (from reflecting off the coating) and a second path length (by being transmitted through the coating and reflecting off a mirror disposed behind the coating), or other suitable processes can be used. The method then proceeds to 908.

At 908 brightness variation is measured at inspection areas. In one exemplary embodiment, the height of bumps relative to a substrate or other suitable criteria can be determined by measuring brightness variations at predetermined points, such as to determine whether interference is occurring at locations in accordance with the expected height for such locations. The method then proceeds to 910.

At 910 it is determined whether brightness variations are occurring at all predetermined locations. In one exemplary embodiment, a component map can be used to identify areas at which interference needs to occur in order to establish that feature heights are within design tolerances. If it is determined at 910 that variations are occurring at all locations then the method proceeds to 912. Otherwise, the method proceeds to 914 where the component is moved and scans are continued until variations are measured in blank areas. In one exemplary embodiment, a component can be moved, a mirror can be moved, or other suitable movements can be performed to allow the height of the component features to be measured. The method then proceeds to 916. Likewise, additional scanning can be bypassed and the process can proceed directly to 916.

At 916 problem areas are mapped, such as to determine whether the component is on an angle, whether dust on sensing equipment or other sources are causing anomalous readings, whether the problem areas indicate widespread failure, or whether other problems exist that require additional operator attention. The method then proceeds to 918 where notification data is generated. In one exemplary embodiment, the notification data can include control data, operator notification data, data that causes a pick-and-place tool to remove a component, data that causes the component to be marked, or other suitable notification data.

In operation, method 900 allows components to be inspected, such as by using a coated mirror to generate a field of interference data, by using an angled mirror or flat mirror, or by other suitable processes. Method 900 thus allows components to be readily inspected and to decrease the amount of time required for interference inspection of components.

Although exemplary embodiments of a system and method of the present invention been described in detail herein, those skilled in the art will also recognize that various substitutions and modifications can be made to the systems and methods without departing from the scope and spirit of the appended claims.

What is claimed is:

1. A method for inspecting components comprising:
receiving brightness data from an interferometer;
determining whether interference is occurring at a first location having a first height using the brightness data;
determining whether interference is occurring at a second location having a second height using the brightness data; and
generating component pass/fail data based on whether interference is occurring at the first location and the second location.

2. The method of claim 1 wherein receiving brightness data from an interferometer comprises receiving brightness data from an interferometer having an angled mirror.

3. The method of claim 1 wherein receiving brightness data from an interferometer comprises receiving brightness data from an interferometer having an angled mirror, and a mirror angle is related to a difference between the first height and the second height.

4. The method of claim 1 wherein receiving brightness data from the interferometer comprises receiving brightness data in a first wavelength range and a second wavelength range.

5. The method of claim 1 wherein generating the component pass/fail data based on whether interference is occurring at the first location and the second location comprises generating component fail data if interference is not occurring at both locations.

6. The method of claim 1, further comprising storing feature location data associated with the first location.

7. The method of claim 1, wherein receiving brightness data from an interferometer comprises controlling a movement rate of the component.

8. The method of claim 1, further comprising generating profile match data.

9. The method of claim 1, wherein the brightness data has been filtered to remove a substrate light component from the brightness data.

10. The method of claim 1, wherein the brightness data has been filtered to remove an excluded feature light component from the brightness data.

* * * * *